(12) United States Patent
Zhang et al.

(10) Patent No.: US 11,498,703 B2
(45) Date of Patent: Nov. 15, 2022

(54) SYSTEM FOR HOLE MAKING FOR AIRCRAFT SKIN BY NORMAL POSITIONING AND LOCKING

(71) Applicant: Beihang University, Beijing (CN)

(72) Inventors: Deyuan Zhang, Beijing (CN);
Shaomin Li, Beijing (CN); Yanqiang Liu, Beijing (CN); Chunjian Liu, Beijing (CN); Hui Tang, Beijing (CN);
Guang Ma, Beijing (CN); Liangliang Ren, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 219 days.

(21) Appl. No.: 16/892,376

(22) Filed: Jun. 4, 2020

(65) Prior Publication Data
US 2021/0253272 A1   Aug. 19, 2021

(30) Foreign Application Priority Data

Feb. 18, 2020   (CN) .......................... 202010100300.2

(51) Int. Cl.
*B64F 5/10* (2017.01)
*B23B 49/02* (2006.01)
(Continued)

(52) U.S. Cl.
CPC ............... *B64F 5/10* (2017.01); *B23B 49/02* (2013.01); *B64C 1/12* (2013.01); *B23Q 1/015* (2013.01); *B23Q 1/626* (2013.01)

(58) Field of Classification Search
CPC ... F64F 5/10; B23B 49/02; B64C 1/12; B23Q 1/015; B23Q 1/626
See application file for complete search history.

(56) References Cited

U.S. PATENT DOCUMENTS 5,477,596 A * 12/1995 Schlosstein ............ B23Q 3/186
29/33 K

FOREIGN PATENT DOCUMENTS

| CN | 207848135 U | | 9/2018 |
| CN | 109877602 A | * | 6/2019 |
| CN | 109877602 B | | 3/2020 |

OTHER PUBLICATIONS

Machine Translation of CN109877602A. by Chen Aimin. "Multi-freedom degree hole making device". (Year: 2019).*
(Continued)

*Primary Examiner* — Nirvana Deonauth
(74) *Attorney, Agent, or Firm* — Amster, Rothstein & Ebenstein LLP

(57) ABSTRACT

The invention discloses a system for hole making for an aircraft skin by normal positioning and locking. The hole-making system includes a posture adjustment part, a normal positioning and locking part and a hole-making execution part. This system solves the problems that the device in the prior art has high complexity and cumbersome positioning and does not adapt to complex curved surfaces, thereby failing to satisfy the needs of efficient hole making in different space states. In the present invention, the expansion of an outer expansion sleeve in a bottom sleeve locks a normal direction for hole making, thereby ensuring the positioning accuracy of the normal direction. An axial position is locked by the mutual cooperation of an axial positioning groove of the bottom sleeve and an axial positioning rib of the outer expansion sleeve. A hole-making auxiliary cylinder contracts to counteract part of an axial force for hole making.

5 Claims, 2 Drawing Sheets

(51) Int. Cl.
*B64C 1/12* (2006.01)
*B23Q 1/01* (2006.01)
*B23Q 1/62* (2006.01)

(56) References Cited

OTHER PUBLICATIONS

Chinese First Office Action dated Oct. 30, 2020 in connection with Chinese Application No. 202010100300.2.
Chinese Second Office Action dated Feb. 22, 2021 in connection with Chinese Application No. 202010100300.2.

* cited by examiner

SYSTEM FOR HOLE MAKING FOR AIRCRAFT SKIN BY NORMAL POSITIONING AND LOCKING

TECHNICAL FIELD

The present invention relates to the technical field of automatic hole-making equipment for aircraft skins, and in particular to a system for hole making for an aircraft skin by normal positioning and locking.

BACKGROUND

Due to the increasingly high processing requirements, modern mechanical processing technology and equipment has shown a development trend of high precision, intelligence and compound type. At present, the common automated hole-making machinery requires the equipment to have extremely high rigidity. This leads to the large size, high complexity and cumbersome positioning of the equipment, which makes the equipment difficult to adapt to complex curved surfaces, thereby failing to satisfy the needs of efficient hole-making in different space states. Therefore, there is a wide range of demands for designing highly-integrated and lightweight automated positioning and hole-making equipment.

SUMMARY

In order to solve the above problems existing in the prior art, an objective of the present invention is to provide a system for hole making for an aircraft skin by normal positioning and locking. The present invention simplifies the positioning process and improves the hole-making efficiency.

To achieve the above purpose, the present invention provides the following technical solution.

The present invention provides a system for hole making for an aircraft skin by normal positioning and locking, including a posture adjustment part, a normal positioning and locking part and a hole-making execution part, where the posture adjustment part mainly includes a Y-axis drive unit, an RX-axis drive device, an RY-axis drive device, an X-axis drive unit, a Z-axis drive unit, a chassis, a guide rail and a system travel mechanism; the guide rail is fixedly arranged; the chassis is connected to the travel mechanism; the system travel mechanism is arranged on the guide rail; the Y-axis drive unit and the X-axis drive unit are both fixedly connected to the chassis; the RX-axis drive device and the RY-axis drive device are both fixedly connected to the Y-axis drive unit and are relatively independent; the Z-axis drive unit is fixedly connected to the RY-axis drive device;

the normal positioning and locking part includes a bottom sleeve, a drill plate, a skin, an expansion sleeve locking cylinder, a horizontal push rod, an expansion sleeve support, an outer expansion sleeve, a guide unit support, an expansion sleeve locking slider and an inner drill sleeve; the drill plate is fixedly connected to the aircraft skin; the bottom sleeve is fixedly connected to an inner hole of the drill plate; the skin is fixedly connected to a lower surface of the drill plate; the guide unit support is fixedly connected to a hole-making auxiliary cylinder lower bracket; the expansion sleeve locking cylinder is fixedly connected to the guide unit support; the inner drill sleeve is screwed to the guide unit support; the guide unit support is provided with a horizontal sliding chute and a vertical sliding chute; the expansion sleeve support is placed in the vertical sliding chute; the horizontal push rod is placed in the horizontal sliding chute; the expansion sleeve support is provided with a sliding chute, which has a certain angle with a horizontal direction; the expansion sleeve locking slider is placed in the sliding chute of the expansion sleeve support; the expansion sleeve locking slider is fixedly connected to the horizontal push rod; a telescopic rod of the expansion sleeve locking cylinder is fixedly connected to the horizontal push rod;

the hole-making execution part includes a variable-angle head, a tool drive unit, a Z-axis slider, a Z-axis guide rail, a Z-axis lead screw unit, a feed rod slider, a guiding feed rod, a guiding feed rod support, a bit, a hole-making auxiliary cylinder lower bracket, a hole-making auxiliary cylinder upper bracket, a hole-making auxiliary cylinder, a hole-making unit support and a variable-angle head support; the tool drive unit is fixedly connected to the variable-angle head; the variable-angle head is fixedly connected to the variable-angle head support; the bit is connected to the variable-angle head; the variable-angle head support is fixedly connected to the hole-making unit support; the hole-making unit support is fixedly connected to the Z-axis slider, and the Z-axis slider is placed on the Z-axis guide rail; the hole-making auxiliary cylinder is fixedly connected to the hole-making unit support; a push rod of the hole-making auxiliary cylinder is connected to the hole-making auxiliary cylinder lower bracket; the Z-axis lead screw unit is connected to the Z-axis drive unit; the feed rod slider is fixedly connected to the hole-making unit support; the guiding feed rod is fixedly connected to the guiding feed rod support; the guiding feed rod support is fixedly connected to the guide unit support; the feed rod slider is placed on the guiding feed rod; the hole-making auxiliary cylinder upper bracket is fixedly connected to the hole-making unit support.

Preferably, there are two hole-making auxiliary cylinders, and the two hole-making auxiliary cylinders are symmetrically arranged on both sides of the bit; the guiding feed rod is parallel to an axis of the outer expansion sleeve.

Preferably, the outer expansion sleeve is provided with an axial positioning rib; an outer surface of the outer expansion sleeve is in contact with an inner surface of the inner drill sleeve, and the two have the same taper.

Preferably, an inner hole of the bottom sleeve is provided with an axial positioning groove; a width of the axial positioning groove is the same as a width of the axial positioning rib; a diameter of the inner hole of the bottom sleeve is larger than an outer diameter of the outer expansion sleeve; an inner surface of an upper edge of the bottom sleeve is provided with a fillet.

Preferably, an outer surface of a lower edge of the outer expansion sleeve is provided with a fillet.

Compared with the prior art, the present invention achieves the following technical effects:

In the present invention, the expansion of an outer expansion sleeve in a bottom sleeve locks a normal direction for hole making, thereby ensuring the positioning accuracy of the normal direction. An axial position is locked by the mutual cooperation of an axial positioning groove of the bottom sleeve and an axial positioning rib of the outer expansion sleeve. A hole-making auxiliary cylinder contracts to counteract part of an axial force for hole making. In this way, the present invention reduces the external force on the system and improves the operation stability of the equipment, thereby simplifying the positioning process and improving the hole-making efficiency.

BRIEF DESCRIPTION OF DRAWINGS

To describe the technical solutions in the examples of the present invention or in the prior art more clearly, the accompanying drawings required for describing the examples are briefly described below. Apparently, the accompanying drawings in the following description show merely some examples of the present invention, and a person of ordinary skill in the art may still derive other drawings from these accompanying drawings without creative efforts.

Figure 1:
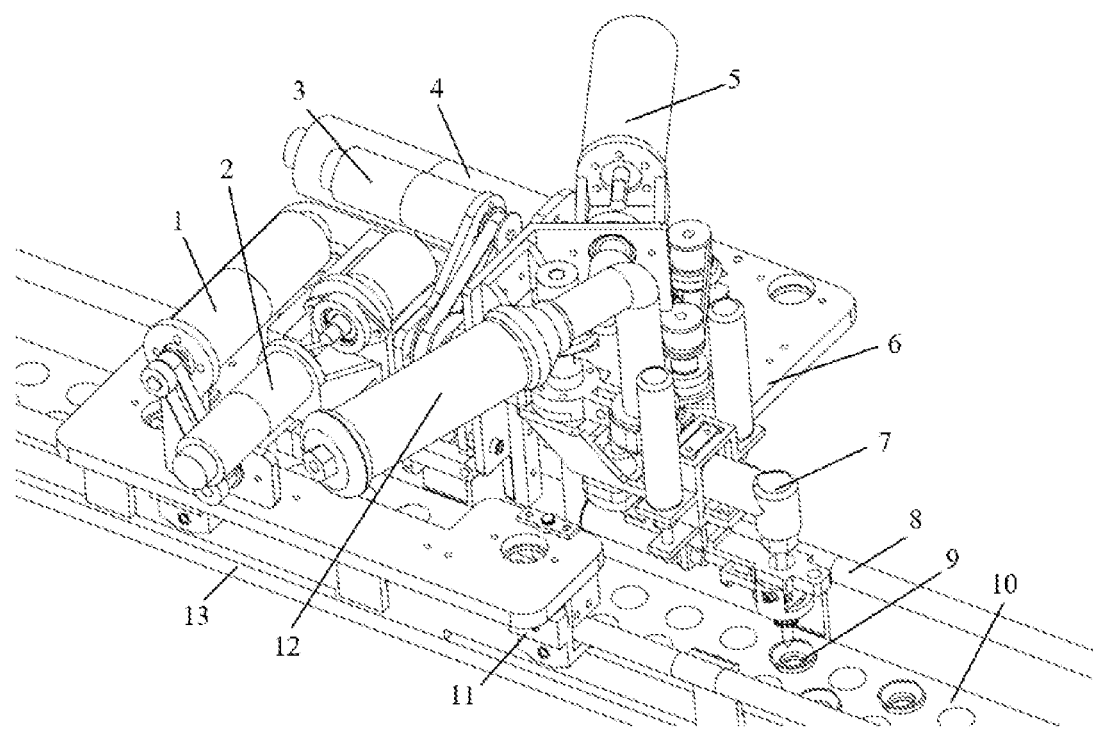
FIG. 1 is a structural diagram of a system for hole making for an aircraft skin by normal positioning and locking provided by the present invention.

Reference Numerals: 1. Y-axis drive unit, 2. RX-axis drive device, 3. RY-axis drive device, 4. X-axis drive unit, 5. Z-axis drive unit, 6. chassis, 7. variable-angle head, 8. guide rail, 9. bottom sleeve, 10. drill plate, 11. system travel mechanism, 12. tool drive unit, 13. skin, 14. Z-axis slider, 15. Z-axis guide rail, 16. Z-axis lead screw unit, 17. feed rod slider, 18. guiding feed rod, 19. guiding feed rod support, 20. expansion sleeve locking cylinder, 21. horizontal push rod, 22. expansion sleeve support, 23. bit, 24. outer expansion sleeve, 25. guide unit support, 26. expansion sleeve locking slider, 27. hole-making auxiliary cylinder lower bracket, 28. hole-making auxiliary cylinder upper support, 29. hole-making auxiliary cylinder, 30. hole-making unit support, 31. variable-angle head support, and 32. inner drill sleeve.

DETAILED DESCRIPTION

The technical solutions in the examples of the present invention are clearly and completely described below with reference to the accompanying drawings in the examples of the present invention. Apparently, the described examples are merely a part rather than all of the examples of the present invention. All other examples obtained by a person of ordinary skill in the art based on the examples of the disclosure without creative efforts shall fall within the protection scope of the disclosure.

In order to solve the problems existing in the prior art, an objective of the present invention is to provide a system for hole making for an aircraft skin by normal positioning and locking. The present invention simplifies the positioning process and improves the hole-making efficiency.

In order to make the above objectives, features, and advantages of the present invention clearer and more comprehensible, the present invention is described in further detail below with reference to the accompanying drawings and specific implementations.

Figure 2:
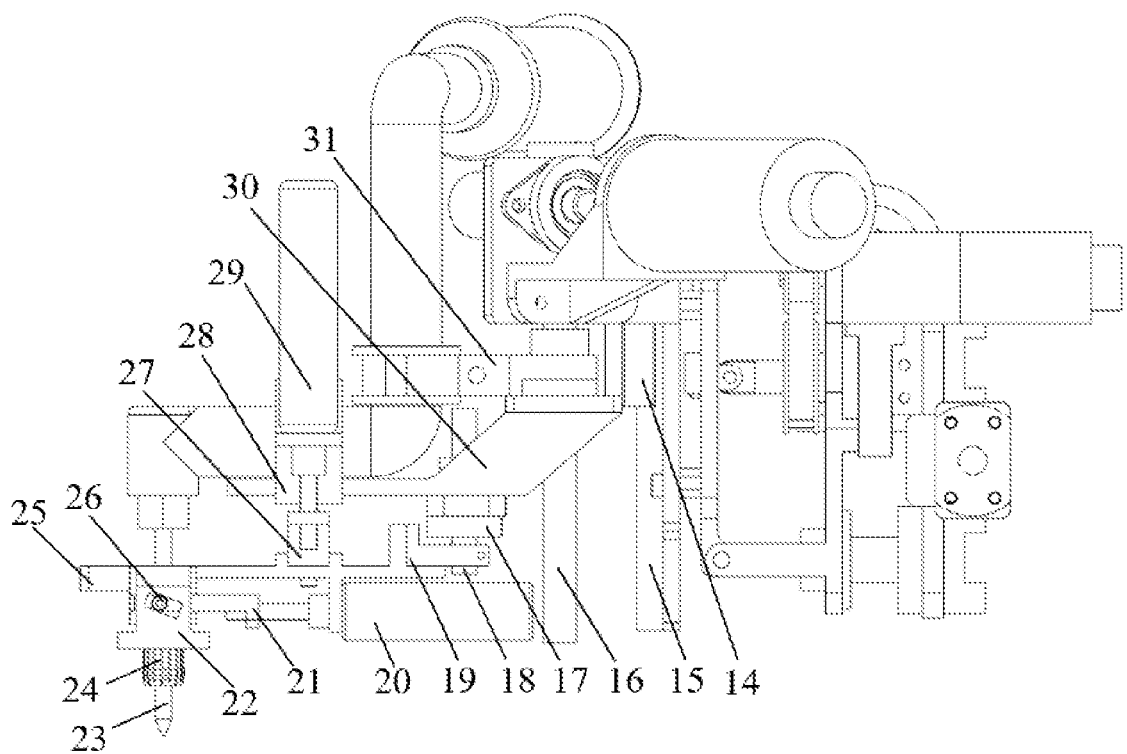
FIG. 2 is a structural diagram of a front end of a system for hole making for an aircraft skin by normal positioning and locking provided by the present invention.
Figure 3:
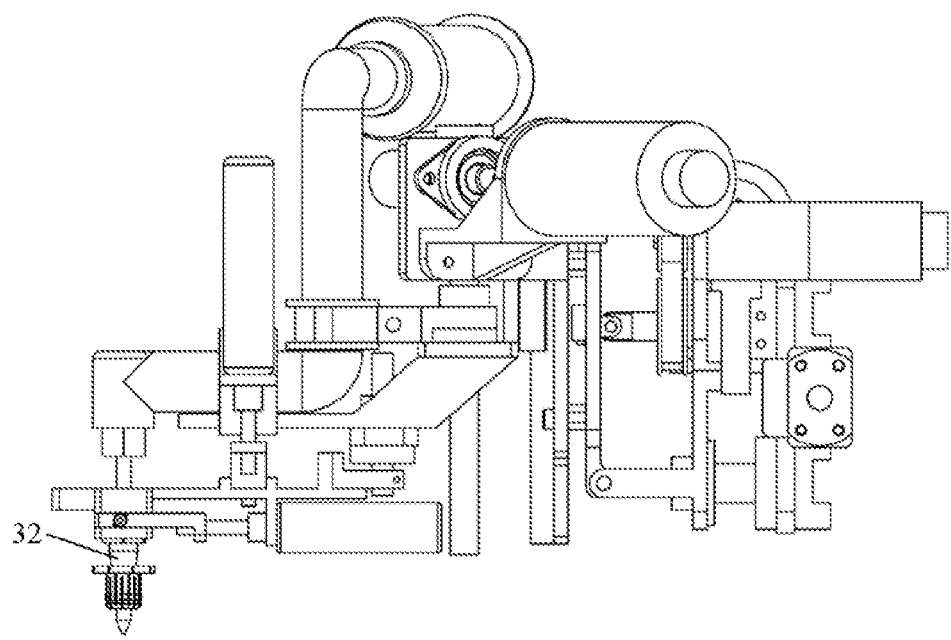
FIG. 3 is a structural diagram of an inner drill sleeve of a system for hole making for an aircraft skin by normal positioning and locking provided by the present invention.
Figure 4:
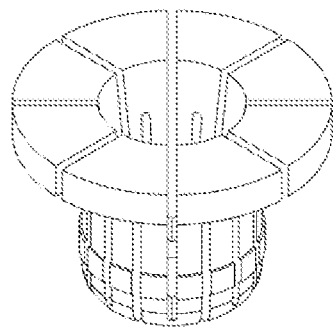
FIG. 4 is a structural diagram of an outer expansion sleeve of a system for hole making for an aircraft skin by normal positioning and locking provided by the present invention.

As shown in FIGS. 1 to 4, this example provides a system for hole making for an aircraft skin 13 by normal positioning and locking, including: a posture adjustment part, a normal positioning and locking part and a hole-making execution part, where the posture adjustment part mainly includes a Y-axis drive unit 1, an RX-axis drive device 42, an RY-axis drive device 3, an X-axis drive unit 4, a Z-axis drive unit 5, a chassis 6, a guide rail 8 and a system travel mechanism 11; the guide rail 8 is fixedly arranged; the chassis 6 is connected to the travel mechanism; the system travel mechanism 11 is arranged on the guide rail 8; specifically, the system travel mechanism 11 is connected to the guide rail 8 through a roller thereof; the system travel mechanism 11 is driven by a motor; the Y-axis drive unit 1 and the X-axis drive unit 4 are both fixedly connected to the chassis 6 to drive the chassis 6 to move in an X-axis and a Y-axis; the RX-axis drive device 42 and the RY-axis drive device 3 are both fixedly connected to the Y-axis drive unit 1 and are relatively independent; the Z-axis drive unit 5 is fixedly connected to the RY-axis drive device 3; the X-axis is defined as a direction along the guide rail 8; a Z-axis is defined as a hole-making direction; the Y-axis is a direction perpendicular to the X-axis and the Z-axis; an RX-axis and an RY-axis are directions of rotating around the X-axis and the Y-axis; the X-axis drive unit 4 adopts a rack-and-pinion drive method, and the Y-axis drive unit 1 and the Z-axis drive unit 5 adopt a ball screw drive method.

The normal positioning and locking part includes a bottom sleeve 9, a drill plate 10, a skin 13, an expansion sleeve locking cylinder 20, a horizontal push rod 21, an expansion sleeve support 22, an outer expansion sleeve 24, a guide unit support 25, an expansion sleeve locking slider 26 and an inner drill sleeve 32; the drill plate 10 is fixedly connected to the aircraft skin; the bottom sleeve 9 is fixedly connected to an inner hole of the drill plate 10; the skin 13 is fixedly connected to a lower surface of the drill plate 10; the guide unit support 25 is fixedly connected, specifically, screwed to a hole-making auxiliary cylinder lower bracket 27; the hole-making auxiliary cylinder lower bracket 27 is a follow-up support structure and is connected to a push rod of the hole-making auxiliary cylinder; the expansion sleeve locking cylinder 20 is fixedly connected to the guide unit support 25; the inner drill sleeve 32 is screwed to the guide unit support 25; the guide unit support 25 is provided with a horizontal sliding chute and a vertical sliding chute; the expansion sleeve support 22 is slidingly connected in the vertical sliding chute; the horizontal push rod 21 is placed in the horizontal sliding chute; the expansion sleeve support 22 is provided with a sliding chute, which has an angle of preferably 20-40° with a horizontal direction; the expansion sleeve locking slider 26 is placed in the sliding chute of the expansion sleeve support 22; the expansion sleeve locking slider 26 is fixedly connected to the horizontal push rod 21; a telescopic rod of the expansion sleeve locking cylinder 20 is fixedly connected to the horizontal push rod 21, and is used to drive the horizontal push rod 21 to move horizontally to realize the sliding of the expansion sleeve locking slider 26 in the sliding chute of the expansion sleeve support 22; the sliding realizes the vertical movement of the expansion sleeve support 22 in a vertical direction to change a relative position of the outer expansion sleeve 24 and the inner drill sleeve 32; thus, the expansion and contraction of the outer expansion sleeve 24 is realized by the relative position change of a conical surface of the outer expansion sleeve 24 and the inner drill sleeve 32.

The hole-making execution part includes a variable-angle head 7, a tool drive unit 12, a Z-axis slider 14, a Z-axis guide rail 15, a Z-axis lead screw unit 16, a feed rod slider 17, a guiding feed rod 18, a guiding feed rod support 19, a bit 23, a hole-making auxiliary cylinder lower bracket 27, a hole-making auxiliary cylinder upper bracket 28, a hole-making auxiliary cylinder 29, a hole-making unit support 30 and a variable-angle head support 31; the tool drive unit 12 is fixedly connected to the variable-angle head 7; the tool drive unit 12 usually uses a pneumatic or electric motor for generating a rotary motion in the RZ direction; the bit 23 is connected to the variable-angle head 7; the variable-angle head 7 is fixedly connected to the variable-angle head support 31; the variable-angle head support 31 is fixedly connected to the hole-making unit support; the hole-making unit support is fixedly connected to the Z-axis slider 14, and the Z-axis slider 14 is placed on the Z-axis guide rail 15; the Z-axis guide rail 15 is arranged on the Z-axis lead screw unit 16 arranged in the Z-axis direction; the hole-making auxiliary cylinder 29 is fixedly connected to the hole-making unit support; the guide unit support is fixedly connected to the hole-making auxiliary cylinder lower bracket; a body of the hole-making auxiliary cylinder is fixedly connected to the hole-making auxiliary cylinder upper bracket; a push rod of the hole-making auxiliary cylinder is fixedly connected to the hole-making auxiliary cylinder lower bracket; the Z-axis lead screw unit 16 is fixedly connected to the Z-axis drive unit 5; the feed rod slider 17 is fixedly connected to the hole-making unit support; the guiding feed rod 18 is fixedly connected to the guiding feed rod support 19; the guiding feed rod support 19 is fixedly connected to the guide unit support 25; the feed rod slider 17 is slidingly connected to the guiding feed rod 18; the hole-making auxiliary cylinder upper bracket 28 is fixedly connected to the hole-making unit support; in this way, the positioning and locking part is driven to generate a vertical motion to expand before hole making and contract after hole making, thereby assisting the tool feed.

There are two hole-making auxiliary cylinders 29, and the two hole-making auxiliary cylinders 29 are symmetrically arranged on both sides of the bit 23; the guiding feed rod 18 is parallel to an axis of the outer expansion sleeve 24, so that the outer expansion sleeve 24 and the bottom sleeve 9 are coaxial after being mated, thereby ensuring the positioning accuracy during hole making.

The outer expansion sleeve 24 is provided with an axial positioning rib; an outer surface of the outer expansion sleeve 24 is in contact with an inner surface of the inner drill sleeve 32, and the two have the same taper, that is, the outer expansion sleeve 24 expands or contracts with the inner drill sleeve when sliding along the inner drill sleeve 32.

An inner hole of the bottom sleeve 9 is provided with an axial positioning groove; a width of the axial positioning groove is the same as a width of the axial positioning rib; a diameter of the inner hole of the bottom sleeve 9 is larger than an outer diameter of the outer expansion sleeve 24, that is, the diameter of the expansion sleeve is small when the expansion sleeve is not expanded, which is convenient for the automated system to fall into the bottom sleeve 9; an inner surface of an upper edge of the bottom sleeve 9 is provided with a fillet to achieve axial locking, thereby preventing the expansion sleeve from being pulled out by a pull-up force during hole making.

An outer surface of a lower edge of the outer expansion sleeve 24 is provided with a fillet, so that the positioning and locking mechanism can slide in to avoid collision when it falls into the bottom sleeve 9.

The hole-making system works as follows:

First, posture adjustment: the motor is started to drive various units, including the X, Y, Z, RX and RY-axes, so that the position and posture of the device reach a specified state, that is, they reach a predetermined hole position to align with the normal direction.

Second, normal positioning and locking: the hole-making auxiliary cylinder is extended, and the expansion sleeve support 22 falls into the inner hole of the bottom sleeve 9 with the assistance of the Z-axis drive unit 5; the expansion sleeve locking cylinder 20 responds, and the horizontal push rod 21 drives the sliding of the expansion sleeve locking slider 26; the outer expansion sleeve 24 expands, and the outer surface of the outer expansion sleeve 24 locks with the inner surface of the bottom sleeve 9; the axial positioning rib mates with the axial positioning groove of the bottom sleeve 9.

Third, hole making: the bit 23 is started, and driven by the Z-axis drive unit 5; the hole-making auxiliary cylinder contracts, and the feed rod slider 17 on the guide unit support 25 slides along the guiding feed rod 18 to reach a predetermined position, thereby completing the hole making.

Specific examples are applied in this specification to describe the principle and implementations of the present invention. The description of the aforementioned examples is only used for facilitating understanding of the method and the core idea of the present invention; and meanwhile, for those of ordinary skills in the art, there will be changes in specific implementations and application scope in accordance with the concept of the present invention. In conclusion, the content of this specification shall not be construed as a limitation to the present invention.

What is claimed is:

1. A system for hole making for an aircraft skin by normal positioning and locking, comprising a posture adjustment part, a normal positioning and locking part and a hole-making execution part, wherein the posture adjustment part comprises a Y-axis drive unit, an RX-axis drive, an RY-axis drive, an X-axis drive unit, a Z-axis drive unit, a chassis, a guide rail and a system travel mechanism; the guide rail is fixedly arranged; the chassis is connected to the travel mechanism; the system travel mechanism is arranged on the guide rail; the Y-axis drive unit and the X-axis drive unit are both fixedly connected to the chassis; the RX-axis drive and the RY-axis drive are both fixedly connected to the Y-axis drive unit and are independent of each other; the Z-axis drive unit is fixedly connected to the RY-axis drive;

the normal positioning and locking part comprises a bottom sleeve, a drill plate, the aircraft skin, an expansion sleeve locking cylinder, a horizontal push rod, an expansion sleeve support, an outer expansion sleeve, a guide unit support, an expansion sleeve locking slider and an inner drill sleeve; the drill plate is fixedly connected to the aircraft skin; the bottom sleeve is fixedly connected to an inner hole of the drill plate; the aircraft skin is fixedly connected to a lower surface of the drill plate; the guide unit support is fixedly connected to a hole-making auxiliary cylinder lower bracket; the expansion sleeve locking cylinder is fixedly connected to the guide unit support; the inner drill sleeve is screwed to the guide unit support; the guide unit support is provided with a horizontal sliding chute and a vertical sliding chute; the expansion sleeve support is placed in the vertical sliding chute; the horizontal push rod is placed in the horizontal sliding chute; the expansion sleeve support is provided with a sliding chute, which has an angle with a horizontal direction; the expansion sleeve locking slider is placed in the sliding chute of the expansion sleeve support; the expansion sleeve locking slider is fixedly connected to the horizontal push rod; a telescopic rod of the expansion sleeve locking cylinder is fixedly connected to the horizontal push rod;

the hole-making execution part comprises a variable-angle head, a tool drive unit, a Z-axis slider, a Z-axis guide rail, a Z-axis lead screw unit, a feed rod slider, a guiding feed rod, a guiding feed rod support, a bit, the hole-making auxiliary cylinder lower bracket, a hole-making auxiliary cylinder upper bracket, a hole-making auxiliary cylinder, a hole-making unit support and a variable-angle head support; the tool drive unit is fixedly connected to the variable-angle head; the variable-angle head is fixedly connected to the variable-angle head support; the bit is connected to the variable-angle head; the variable-angle head support is fixedly connected to the hole-making unit support; the hole-making unit support is fixedly connected to the Z-axis slider, and the Z-axis slider is placed on the Z-axis guide rail; the hole-making auxiliary cylinder is fixedly connected to the hole-making unit support; a push rod of the hole-making auxiliary cylinder is connected to the hole-making auxiliary cylinder lower bracket; the Z-axis lead screw unit is connected to the Z-axis drive unit; the feed rod slider is fixedly connected to the hole-making unit support; the guiding feed rod is fixedly connected to the guiding feed rod support; the guiding feed rod support is fixedly connected to the guide unit support; the feed rod slider is placed on the guiding feed rod; the hole-making auxiliary cylinder upper bracket is fixedly connected to the hole-making unit support.

2. The system for hole making for the aircraft skin by normal positioning and locking according to claim 1, wherein there are two hole-making auxiliary cylinders, and the two hole-making auxiliary cylinders are symmetrically arranged on two sides of the bit; the guiding feed rod is parallel to an axis of the outer expansion sleeve.

3. The system for hole making for the aircraft skin by normal positioning and locking according to claim 2, wherein the outer expansion sleeve is provided with an axial positioning rib; an outer surface of the outer expansion sleeve is in contact with an inner surface of the inner drill sleeve, and the outer expansion sleeve expands or contracts with the inner drill sleeve when sliding along the inner drill sleeve.

4. The system for hole making for an the aircraft skin by normal positioning and locking according to claim 3, wherein an inner hole of the bottom sleeve is provided with an axial positioning groove; a width of the axial positioning groove is the same dimension as a width of the axial positioning rib; a diameter of the inner hole of the bottom sleeve is larger than an outer diameter of the outer expansion sleeve; an inner surface of an upper edge of the bottom sleeve is provided with a fillet.

5. The system for hole making for the aircraft skin by normal positioning and locking according to claim 2, wherein an outer surface of a lower edge of the outer expansion sleeve is provided with a fillet.

* * * * *